United States Patent Office 3,231,496
Patented Jan. 25, 1966

3,231,496
EMULSIONS OF ORGANOPOLYSILOXANE OILS AND WATER
Anton S. Pater, Williamsville, N.Y., assignor to Union Carbide Corporation, a corporation of New York
No Drawing. Original application June 11, 1962, Ser. No. 201,258. Divided and this application Nov. 5, 1964, Ser. No. 409,272
10 Claims. (Cl. 252—34.7)

This application is a division of my copending application Serial No. 201,258, filed June 11, 1962, which is a continuation-in-part of my application Serial No. 862,-775, filed December 30, 1959 and now abandoned; and a continuation-in-part of my application Serial No. 745,-254, filed June 30, 1958 and now abandoned.

This invention relates to new organosilicon compounds and to emulsions of such compounds which are useful as rubber lubricants. More particularly, this invention relates to copolymeric organosiloxane oils and to emulsions of such oils which are useful as lubricants for rubber articles.

The copolymeric organosiloxane oils of this invention are represented by the formula:

$R_3SiO[(CH_3)_2SiO]_x[(CH_3)(C_2H_5)SiO]_w$

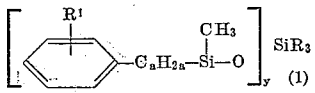

$$\left[ \begin{array}{c} R^1 \\ \diagup\!\!\!\diagdown \\ \diagdown\!\!\!\diagup \end{array} \!\!-\!C_aH_{2a}\!-\!\overset{CH_3}{\underset{|}{Si}}\!-\!O \right]_y SiR_3 \quad (1)$$

wherein R is a hydrocarbyl group, $R^1$ is selected from the class consisting of a hydrogen atom and a methyl radical, $(a)$ is a whole number from 2 to 3 inclusive, $(x)$ is a number, $(w)$ is a number, the sum of $(x)$ and $(w)$ is at least 1, $(y)$ is a number of at least 1, and the ratio of $(x)+(w)$ to $(y)$ is from 1:1 to 3:1. Such oils also have a viscosity of between 25 to 10,000 centistokes at 25° C. By the term "hydrocarbyl," as used herein, is meant a monovalent hydrocarbon radical. By the term "number," as used herein, is meant 0 or higher whole or fractional values.

It is known that dimethylsiloxane oils can be used to lubricate rubber articles, e.g., to prevent said rubber articles from adhering to one another or to permit easier insertion of rubber stoppers into glass vials. Dimethylsiloxane oils are also known to be useful as release agents for molded rubber articles. These dimethylsiloxane oil release agents are advantageously used since they give a longer lasting coating on the molds and do not decompose during molding operation to give any build-up of decomposition products which are the disadvantages of the organic release agents. The dimethylsiloxane oil lubricants, however, have a major disadvantage where they are used on or near articles which are to be painted, in that even the thinnest films of dimethylsiloxane oil on the articles cause blemishes and craters in the painted surfaces. It has been found that when the heretofore known dimethylsiloxane oils were left open to the air in the vicinity of articles being painted, that films of the dimethylsiloxane oil collect on the surface of the articles making them unsuitable for painting. Removal of the dimethylsiloxane oils from such articles has been found to require expensive and time-consuming procedures. There is furthermore, no guarantee that these expensive and time-consuming removal procedures will result in a surface which is suitable for painting. Another disadvantage of heretofore known dimethylsiloxane lubricants is that such lubricants contaminate the atmosphere about them, especially at elevated temperatures, e.g. where the painted article must be subjected to a heat cure, causing craters and other unsightly imperfections in the painted surfaces. These problems are particularly prevalent in the automotive industry where the rubber seals for doors and trunk lids are lubricated to prevent excessive wear of the seals and to prevent sticking and resultant damage to said seals. Although heretofore known dimethylsiloxane oils are lubricants for rubber, they cannot be employed in the vicinity of unpainted or painted automobile bodies without contaminating the surfaces of the bodies with a thin film of the oil, thus making the surfaces unsuitable for subsequent painting or repainting. When freshly painted bodies, on which the rubber components are lubricated by heretofore known dimethylsiloxane oils, are subjected to baking at elevated temperatures, unsightly imperfections, such as: craters, blemishes, streaks and the like, develop in the painted surface.

It is the object of the present invention to provide copolymeric organosiloxane oils which are useful as rubber lubricants, are readily removed when desired by simple cleaning methods, are not appreciably absorbed by the rubber and are free of any volatile material which causes blemishes and imperfections in freshly painted surfaces. It is a further object of this invention to provide emulsions of these copolymeric organosiloxane oils which are useful as rubber lubricants and possess the above advantageous properties.

The present invention is based upon my discovery that the copolymeric organosiloxane oils depicted in Formula 1, wherein the ratio of $(x)+(w)$ to $(y)$ is from 1:1 to 3:1, are good rubber lubricants, are easily removed when desired by simple cleaning methods, are not appreciably absorbed by the rubber, and are free of any volatile material which causes blemishes when subjected to elevated temperatures.

The copolymeric organosiloxane oils of this invention are the trihydrocarbylsiloxy end-blocked copolymeric organosiloxanes composed of units selected from the group consisting of dimethylsiloxane units,
ethylmethylsiloxane units,
(phenylethyl)methylsiloxane units,
(phenylpropyl)methylsiloxane units,
(tolylethyl)methylsiloxane units and
(tolylpropyl)methylsiloxane units.

Illustrative examples of oils included within the scope of the invention are:

copolymeric (phenylethyl)methylsiloxane-dimethylsiloxane oils,
copolymeric (phenylethyl)methylsiloxane-ethylmethylsiloxane oils,
copolymeric (phenylethyl)methylsiloxane-dimethylsiloxane-ethylmethylsiloxane oils,
copolymeric (phenylpropyl)methylsiloxane-dimethylsiloxane oils,
copolymeric (phenylpropyl)methylsiloxane-ethylmethylsiloxane oils,
copolymeric (phenylpropyl)methylsiloxane-dimethylsiloxane-ethylmethylsiloxane oils,
copolymeric (tolylethyl)methylsiloxane-dimethylsiloxane oils,
copolymeric (tolylethylmethylsiloxane-ethylmethylsiloxane oils,
copolymeric (tolylethyl)methylsiloxane-dimethylsiloxane ethylmethylsiloxane oils,
copolymeric tolylpropyl)methylsiloxane-dimethylsiloxane oils,
copolymeric (tolylpropyl)methylsiloxane-ethylmethylsiloxane oils and
copolymeric (tolylpropyl)methylsiloxane-dimethylsiloxane-ethylmethylsiloxane oils.

These specific copolymeric oils all are included within the generic Formula 1 described above.

The (arylalkyl)methylsiloxane units can be copolymerized with dimethylsiloxane units alone, with ethylmethylsiloxane units alone or with mixtures of dimethylsiloxane units and ethylmethylsiloxane units. In such latter mixtures of dimethylsiloxane units and ethylmethylsiloxane units, the dimethylsiloxane units can comprise from 0 to 100 weight percent and the ethylmethylsiloxane units can comprise from 0 to 100 weight percent. The term "arylalkyl" as used herein specifically refers to (phenylethyl), (phenylpropyl), (tolylethyl) and (tolylpropyl) units.

The term "phenylethyl" without the prefix "alpha" or "beta" and the group

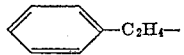

are herein employed in the generic sense to designate either alpha-phenylethyl,

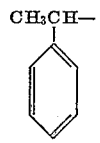

or beta-phenylethyl,

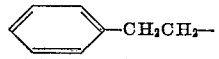

Thus, my novel copolymeric oils include those containing only alpha-phenylethyl groups, only beta-phenylethyl groups, and also those containing a mixture of both the alpha- and beta-phenylethyl groups. Likewise, the term "tolylethyl" without the prefix "alpha" or "beta" and the group

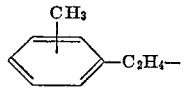

are herein employed in the generic sense to designate either alpha-tolylethyl,

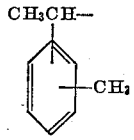

or beta-tolylethyl,

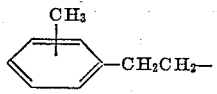

Thus, my novel copolymeric oils include those containing only alpha-tolylethyl groups, only beta-tolylethyl groups, and also those containing a mixture of both the alpha- and beta-tolylethyl groups.

In a similar fashion the term "phenylpropyl" without the prefix "alpha," "beta" or "gamma" and the group

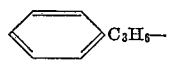

are herein employed in the generic sense to designate alpha-phenylpropyl,

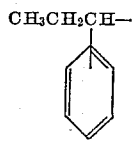

beta-phenylpropyl,

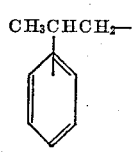

or gamma-phenylpropyl,

Thus, my novel copolymeric oils include those containing only alpha-phenylpropyl groups, only beta-phenylpropyl groups, only gamma-phenylpropyl groups, and also those containing a mixture of alpha-, beta- and gamma-phenylpropyl groups.

Still further, the term "tolylpropyl" without the prefix "alpha," "beta" or "gamma" and the group

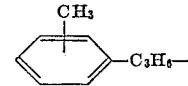

are herein employed in the generic sense to designate alpha-tolylpropyl,

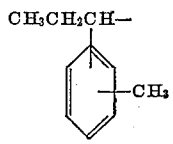

beta-tolylpropyl,

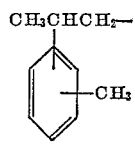

gamma-tolylpropyl,

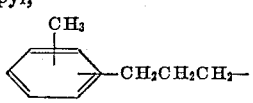

Thus, my novel copolymeric oils include those containing only alpha-tolylpropyl groups, only beta-tolylpropyl groups, only gamma-tolylpropyl groups, and also those containing a mixture of alpha-, beta- and gamma-tolylpropyl groups.

It is essential, for the purposes of this invention, that the ratio of the total of dimethylsiloxane units and ethylmethylsiloxane units to (arylalkyl)methylsiloxane units be from 1:1 to 3:1. In terms of the Formula 1, the ratio of the sum of the $(x)+(w)$ to $(y)$ should be from 1:1 to 3:1. Copolymeric organosiloxane oils having a ratio of more than 3:1 are not easily removed from articles prior to painting. Copolymeric organosiloxane oils having a ratio of less than 1:1 are too readily absorbed by rubber articles to be used as rubber lubricants. These oils are end-blocked (i.e. terminated) with any trihydrocarbylsiloxy grouping; however, it is preferred that the end-blocker be trimethylsiloxy units. Thus, the preferred oils of this invention are the trimethylsiloxy end-blocked copolymeric oils having a viscosity of from 25 centistokes to 10,000 centistokes at 25° C. This viscosity range corresponds to a molecular weight range of from approximately 600 to approximately 15,000.

The novel copolymeric oils of my invention can be prepared in various ways. The "phenylethyl" containing copolymers can be advantageously prepared by the equilibration of octamethylcyclotetrasiloxane, a hexahydrocarbyldisiloxane and tetra(phenylethyl)tetramethylcyclotetrasiloxane in an acidic or basic medium employing equilibration techniques commonly known in the art of silicon chemistry. This product is a copolymeric (phenylethyl)methylsiloxane-dimethylsiloxane oil. The (phenylethyl)methylsiloxane - ethylmethylsiloxane copolymeric oils can be prepared by substituting tetraethyltetramethylcyclotetrasiloxane for the octamethylcyclotetrasiloxane above. Mixtures of octamethylcyclotetrasiloxane and tetraethyltetramethylcyclotetrasiloxane can also be employed. These oils can also be prepared by the cohydrolysis and co-condensation of the corresponding chlorosilanes; i.e. dimethyldichlorosilane, (phenylethyl)methyldichlorosilane and a trihydrocarbylchlorosilane. Ethylmethyldichlorosilane can also be included in admixture with the dimethyldichlorosilane or in substitution therefore.

The "tolylethyl" containing copolymers can be prepared in the same manner as described above except that a "tolylethyl" containing material is substituted for the "phenylethyl" material.

The "phenylpropyl" containing copolymers are preferably prepared by equilibrating a mixture of (1) methylhydrogensiloxane and (2) dimethylsiloxane or ethylmethylsiloxane or a mixtre of dimethylsiloxane and ethylmethylsiloxane and then reacting such equilibrated mixture with alpha-methylstyrene or allylbenzene in the presence of a platinum catalyst, such as chloroplatinic acid. This reaction between Si–H containing compounds and compounds containing olefinic unsaturation is known in the art. Use of alpha-methyl styrene forms "alpha-phenylethyl" and "beta-phenylethyl" compounds. The "beta-phenylethyl" compounds are preferentially formed. Use of allylbenzene results in "gamma-phenylethyl" compounds.

The "tolylpropyl" containing copolymers can be prepared in the same manner as described above except that (methylvinyl) toluene is substituted for alpha-methyl styrene and allyltoluene is substituted for allylbenzene.

The copolymeric oils of this invention having the formula shown in Formula 1 are useful per se as rubber lubricants. They are applied in any suitable manner convenient to the particular application. For example, these oils can be brushed, sprayed, or spread on the articles being lubricated. A particularly advantageous device for applying the copolymeric oil is an aerosol container containing the oil, from 0.25 to 1.0 wt. percent stearic acid, and a Freon propellent. In this manner, the copolymeric oil is directed in a fine spray on the article being lubricated. The Freon acts as an inert carrier, evaporating after application, and the stearic acid serves to keep the oil from running after the Freon has evaporated.

An important embodiment of my invention includes oil-in-water emulsions which contain as the essential ingredients the copolymeric oils defined above, water and an emulsifier. The copolymeric oils which are used in the emulsions have viscosities in the range from 25 centistokes to 10,000 centistokes at 25° C. and are present in the emulsions in amounts of from 5 to 50 percent by weight of the total emulsion. It is preferred that the viscosity of the copolymeric oil be in the range of from 100 to 1,000 centistokes at 25° C. Copolymeric oils having a viscosity of less than 100 centistokes and those having a viscosity greater than 1,000 centistokes at 25° C. are more difficult to emulsify. It is also preferred that the amount of the copolymeric oil present in the emulsions be from 20 to 35 percent by weight of the total emulsion. Water is present in the emulsions in amounts of from 48.5 to 93.5 percent by weight of the total emulsion. It is preferred that water be present in amounts of from 60 to 75 percent by weight of the total emulsion. Concentrations of the emulsifier of from 1.5 to 20 percent by weight of the total emulsion are used in the emulsions of my invention. However, it is preferred that the concentration of the emulsifier be from 3.5 to 15 percent by weight of the total emulsion. In the practice of my invention, emulsions having a viscosity above 20 centistokes at 25° C. are useful as rubber lubricants. However, it is preferred that the viscosity of the emulsion be in the range of from 1,000 centistokes to 2,000 centistokes at 25° C. Below this preferred viscosity range the emulsions tend to flow away from the area to which they are applied leaving only a thin film which may not provide the desired degree of lubrication. Emulsions having a viscosity greater than 2,000 centistokes at 25° C. are more difficult to apply; however, emulsions of a viscosity greater than 2,000 centistokes at 25 C. can be otherwise used without detrimental effects.

The emulsifying agents employed in the emulsions of this invention are commercially available materials and are of anionic, cationic or nonionic type. Examples of such materials are the salts of fatty acids, containing from 12 to 24 carbon atoms, for example, ammonium oleate, morpholine stearate and the like; acetates of n-primary amines having from 12 to 18 carbon atoms in the amine chain, such as, n-octadodecenylamine acetate, n-dodecylamine acetate and n-octadecadienylamine acetate; monoesters of polyethylene glycols and fatty acids of 12 to 24 carbon atoms, such as, hexaethylene glycol monostearate; alkylated aryl polyether alcohols, such as, acetylphenoxy polyethylene alcohols, polyethylene glycol t-dodecyl thioether and the like. The emulsifying agents which are preferred for use in preparing the emulsions of this invention are those emulsifying agents which can be classified as being of the "fugitive" or "non-wetback" type.

A "fugitive" emulsifier is an emulsifier which decomposes and loses its emulsifying ability in whole or in part when the volatile fraction of the emulsion is removed. Morpholine stearate and ammonium stearate are examples of such emulsifiers, the morpholine or ammonia being the "fugitive" portion of such emulsifiers. For example, as the water evaporates from the emulsions, the morpholine or ammonia is carried off with it, leaving a residue which cannot be re-emulsified by the action of water. A "non-wetback" emulsifier is one which, after the emulsion has dried, cannot be rewet merely by the action of water so as to reform the emulsion. Such a "non-wetback" emulsifier is, for example, "Myrj 52" a polyoxyethylene stearate made by Atlas Powder Company. Thus, these preferred emulsifiers have the advantage that once an emulsion containing such an emulsifier has dried leaving a residue, the dried residue will not be re-emulsified by contact with water and cannot be washed from the article so coated. The use of a "fugitive" or "non-wetback" emulsifier thus prolongs the life of such films where these films are subjected to frequent washings with water such as where the lubricant is applied to the gaskets around the doors of an automobile.

The "fugitive" stearate emulsifiers are prepared by mixing a base, such as morpholine or ammonia, with the stearic acid. The acid and base can be mixed in equivalent amounts. These "fugitive" stearate emulsifiers are advantageous in that after application of the emulsion, the stearic acid is released as a water-insoluble solid which aids in keeping the copolymeric organosiloxane oil lubricant in place after the evaporation of the water. Stearate emulsifiers have the added advantage since they form thixotropic emulsions. Other fatty acids containing from 12 to 24 carbon atoms can be substituted for part of all of the stearic acid in the emulsifier.

An illustrative emulsion in which the emulsifying agent was morpholine stearate was prepared by the following procedure. The stearic acid was melted and an equivalent amount of morpholine added and blended into the stearic acid. A copolymeric phenylethylmethylsiloxane-dimethylsiloxane oil was then added and blended with extensive agitation. Water was then added slowly and the agitation continued until a uniform mixture was obtained.

The viscosity of the emulsions of my invention can be controlled by methods known in the art. Emulsions made from a stearic acid emulsifier tend to be very viscous; however, the viscosity can be lowered by the substitution of oleic acid for part of the stearic acid in the emulsifier. It is desirable that the stearic acid in the emulsifier contain less than 25 percent by weight oleic acid since oleic acid lowers the viscosity of the emulsion below the preferred viscosity range previously described. It is preferred that the stearic acid contain less than 15 percent oleic acid by weight.

In the use of copolymeric oils of the present invention or the emulsions of such oils as lubricants, an inert material which is solid at room temperature can be dispersed in the oil or emulsion to retain the oil in place and prevent the oil from running after application. Such inert solids are, for example, solid petroleum waxes, solid polyethylene waxes, solid fatty acids, finely divided silica and the like.

The viscosity of the emulsions of this invention can also be controlled by the use of thickening agents, such as solid polyethylene oxide, the morpholine salt or compound of polyacrylic acid or gum arabic. Thickener concentrations of up to 10 percent by weight based on total emulsion are useful.

The following tests were employed to test the properties of lubricants. The comparative tests include tests for (1) lubricity, (2) ease of cleaning, and (3) detrimental volatility at paint curing temperatures.

(1) *Lubricity.*—The lubricity of lubricants, insofar as use on rubber gasketing is concerned, is demonstrated by the following test. The test materials are the lubricant to be tested and standard rubber gasketing of the type used on automobile doors. The rubber gasket material is cut into approximately 6 inch lengths and coated with a thin film of the oil or emulsion to be tested. The film is air dried and then heated at 50° C. for 48 hours. The treated gasket material is then cooled to room temperature and a piece of unlubricated rubber gasket is rubbed over the lubricated rubber using slight pressure and the amount of drag noted. With little or no drag, the lubricating ability is defined as being good and where substantial drag is noted, the lubricating ability is defined as being poor.

(2) *Ease of cleaning.*—Several tests which can be used to determine the ease with which lubricants are removed prior to painting an article are given below. The materials used in these tests are the lubricant to be tested, a metal panel, clean soft cloths, and an alkyd type automobile paint.

(2*a*).—One such ease of cleaning test is run according to the following procedures:

A Parkerized panel (4 in. x 6 in.) is coated with a film of the lubricant to be tested. The film is made by spreading about one half gram of the lubricant to be tested over the panel. After air drying for 16 hours, the panel is rubbed several times with a clean, dry cloth until no additional lubricant comes off onto the cloth. This procedure is repeated with a second clean, dry cloth. In this same test, other panels are prepared in the same manner and then cleaned with a cotton cloth folded into a 3″ x 3″ pad and wetted liberally, but not to excess, with naphthol mineral spirits or "Solvasol No. 1." A moderate amount of rubbing is used in each cleaning. The edges of the panel are also wiped. A second such cleaning with a wetted cloth may be carried out with a fresh cloth pad. After cleaning, paint is applied to the panels by flood coating. The panels are then allowed to drain in a vertical position for from ½ to 1 hour and are then cured for 1 hour at 110° C. The panels are cured in separate ovens to avoid any contamination by volatility. The panels are evaluated by a visual examination and classified as given in the following table and also in regard to the number of cleanings necessary.

Ease of cleaning:  Appearance
  Very good _____ Normal (same as that of a blank with no lubricant).
  Good _____ Slight streaking.
  Fair _____ Heavy streaking.
  Poor _____ Fish eyes, blemishes and craters.
  Very poor _____ Rivulets of paint with large islands (¼″ to ½″) almost devoid of paint.

(2*b*).—In a more comprehensive ease of cleaning test, a thin film of the lubricant is applied on a strip ½ inch wide on ½ of the face side of a metal panel painted with a baked enamel. The panel is allowed to air dry for 16 hours and is then sanded lightly with sand paper. The sanding step is not essential but has been included to simulate actual painting practice. The panel is then cleaned with a cotton cloth folded into 6″ x 6″ pad, and wetted liberally with a petroleum naptha (such as Solvasol No. 1). The first solvent cleaning consists of two passes with the wetted cloth, one over each half of the length of the panel followed by cleaning the edges of both sides of the panel and using a fresh uncontaminated surface of the cloth each time. A fresh wetted cloth is used for a second cleaning which is similar to the first except that the edges are not cleaned. The panel is then spray-painted using two thin coats of paint to apply a 3 mil thickness of new paint. The panel is air dried for 10 minutes and then cured for 1 hour at 110° C. The results of this test are evaluated by visual examination and compared to a blank panel which has not been treated with the lubricant. Panels that had the same appearance as the blank were classified as passing the test, while those having more imperfections than the blank were classified as failing this test.

(3) *Detrimental volatility.*—The lubricant is tested according to the following procedure to determine if the lubricant contains any volatile material which, upon subjecting the lubricant to the elevated temperatures of the curing ovens, would migrate to the freshly-painted surfaces thereby causing blemishes and imperfections in said freshly-painted surfaces.

A two gram sample of the lubricant or emulsion is placed in an aluminum cup in a 120° C. circulating air oven. Approximately one minute later, freshly-painted panels are placed in the oven so that vapors from the cup, if any, will be carried onto the panels by the draft in the oven. After one hour the panel is examined for craters and blemishes and compared to panels which were cured at the same temperature for the same length of time in an uncontaminated atmosphere. The absence of any blemishes or craters indicates that the lubricant contains no volatile material which migrates to freshly painted surfaces and causes imperfections and blemishes in the painted surfaces under the heat curing conditions.

Example 1

Into a one liter flask equipped with a stirrer and thermometer were charged water (216 g.) and isopropyl ether (216 cc.). (Beta-phenylethyl)methyldichlorosilane (106 g., 0.484 mol.), dimethyldichlorosilane (187 g., 1.45 mol.) and trimethylmonochlorosilane (7 g.) were mixed in a separate vessel. The chlorosilane mixture was added slowly over a two hour period to the agitated mixture of water and isopropyl ether while maintaining the reaction temperature between 32° C. and 40° C. by external cooling. An additional 250 cc. of water were added to the flask and the water-hydrochloric acid mixture drained from the pot. Sodium bicarbonate (4 g.) and 20 cc. of water were added to the silicone-isopropyl ether mixture, the flask heated and the mixture stripped to a temperature of 130° C. to remove the isopropyl ether. The flask was cooled and the oil filtered to remove the salts. The oil was then recharged into the flask and potassium hydroxide (0.2 g.) was added. The oil was heated at 150° C. to 160° C. for 20 minutes with a slight nitrogen purge. The oil was cooled and filtered. Sulfuric acid (2 cc., 96%) was added and the oil equilibrated for 1 hour at room temperature. Sodium bicarbonate (10 g.) and acetone (50 cc.) were added and the oil then stripped of volatiles to 150° C. The oil was then heated to 250° C. and sparged with nitrogen for one hour at a nitrogen flow of one liter per minute. The resultant oil, dimethylsiloxy unit to (beta-phenylethyl)-methylsiloxy unit ratio of 3:1, had a viscosity of 91 centistokes at 25° C. and a viscosity temperature co-efficient of 0.697. The molecular weight of this oil was 1440.

This oil was readily removed from a paint test panel after two cleanings with naphthol mineral spirits in the manner previously described. This oil passed the detrimental volatility test previously described.

Example II

To a one liter kettle was added 108 cc. of water. Then 5 gram-moles (1095 g.) of a mixture of (alpha-phenylethyl) - methyldichlorosilane and (beta - phenylethyl)-methyldichlorosilane were added over a period of 1 hour under relatively adiabatic conditions. The (phenylethyl)-methyldichlorosilane used was a mixture containing approximately 70 percent by weight (beta-phenylethyl)-methyldichlorosilane and approximately 30 percent by weight (alpha - phenylethyl)methyldichlorosilane. The temperature dropped to 17° C. during the addition. After adding 15 cc. of isopropyl ether, the mixture was heated to reflux over a 2 hour period. The oil was cooled to 120° C. and 11.06 g. of potassium hydroxide pellets were added. After heating at 180° C., an additional 0.4 g. of potassium hydroxide was added to bring the potassium level to about 400 parts per million. Most of the potassium hydroxide had been consumed in neutralizing the acidic chloride in the fluid. After heating for 2 hours at 180° C. with a slight nitrogen purge, the oil was cooled and 2 cc. of concentrated HCl were added. After stirring for 10 minutes, 5 g. of sodium bicarbonate were added, the oil was reheated to 150° C. and filtered. This oil had a viscosity of 560 centistokes at 25° C. This oil contained only (phenylethyl)methylsiloxane units and did not have satisfactory lubricating ability when tested by the previously described method.

Example III (Beta-phenylethyl)methyldichlorosilane (106 g., 0.484 mole), dimethyldichlorosilane (187 g., 1.45 mole) and trimethylchlorosilane (7 g.) were mixed and added over a 2 hour period to an agitated mixture of 216 cc. of water and 216 cc. of isopropyl ether while maintaining the temperature at 40° C. Water (250 cc.) was added and the aqueous acid phase was withdrawn. Sodium bicarbonate (4.0 g.) in 20 cc. of water was added to neutralize the acid and stirred for 30 minutes. The ether and traces of water were removed by stripping at 150° C. The oil was then cooled and filtered. Sulfuric acid (2 cc., 96%) was added and the oil equilibrated for one hour at room temperature. The sulfuric acid was neutralized adding 10 grams of sodium bicarbonate and 50 cc. of acetone. The acetone was removed by heating to 150° C. while purging the head space with nitrogen. After cooling and filtering, the oil was sparged at 250° C. for one hour using a nitrogen flow of one liter per minute. The oil was then filtered. An oil of 87 centistokes viscosity was obtained; this oil has a dimethylsiloxy to (phenylethyl)methylsiloxy ratio of 3:1. This oil passed the detrimental volatility test previously described.

Example IV (Phenylethyl)methyldichlorosilane (220 g., 1.0 mole), dimethyldichlorosilane (258 g., 2.0 moles) and trimethylchlorosilane (32.2 g.) were mixed and then added to 85 grams of water over a period of 75 minutes with stirring. The temperature, during the hydrolysis, decreased to below 0° C. The water was removed by stripping at 150° C. over a period of 225 minutes. The oil was cooled to 110° C. and 3.4 grams of 87% potassium hydroxide was added. The oil was cooled and acidified with hydrochloric acid. An excess of sodium bicarbonate was added to neutralize the hydrochloric acid and the oil filtered. The filter oil was sparged for 2 hours at 200° C. with nitrogen at a flow of 5-liters per minute. An oil having a viscosity of 408 centistokes and a dimethylsiloxy to (phenylethyl)methylsiloxy ratio of 2:1 was obtained. This oil passed the detrimental volatility test previously described.

Example V (Phenylethyl)methyldichlorosilane (326 g., 1.49 moles), dimethyldichlorosilane (577 g., 4.47 moles) and trimethylchlorosilane (4.8 g.) were mixed and then added to an agitated mixture of 648 grams water and 648 grams of isopropyl ether while maintaining the temperature at 45° C. over a period of 107 minutes. Water (750 cc.) was added and the aqueous acid layer removed. The isopropyl ether was removed by heating to 180° C. after adding 3 grams of 87% potassium hydroxide after a temperature of 125° C. was reached. The oil was cooled and 5 cc. of concentrated hydrochloric acid was added. The oil was heated and 20 grams of sodium bicarbonate was then added. The oil was cooled and filtered. Additional high boiling volatile material was removed by sparging for two hours with nitrogen at a flow of 3-liters per minute while heating to 250° C. An oil having a viscosity of 710 centistokes and a dimethylsiloxy to (phenylethyl)methylsiloxy ratio of 3:1 was obtained. This oil passed the detrimental volatility test previously described.

Example VI

A mixture of chlorosilanes consisting of (phenylethyl) methyldichlorosilane (1085 g., 4.95 moles), dimethyldichlorosilane (637 g., 4.95 moles), trimethylchlorosilane (10.9 g.) was added over a 2 hour period to a mixture of 2400 cc. of water and 1000 cc. of isopropyl ether with agitation while maintaining the temperature at 35–40° C. An additional 500 grams of water were added and the acid-water layer removed. The ethereal solution was stripped to 150° C. and the oil cooled to 120° C. and 12 grams of 87% potassium hydroxide was added. The oil was equilibrated at 160-190° C. for 40 minutes and then cooled to 125° C. Concentrated hydrochloric acid (21 cc.) was added. The mixture was heated to 100–117° C. for 5 minutes and 22 grams of sodium bicarbonate were then added and the mixture then heated to 150° C. The oil was cooled and filtered. Volatile materials were removed by heating to 200° C. and sparging with nitrogen at a flow of 6-liters per minute. The oil was then filtered when hot. An oil having a viscosity of 506 centistokes and a dimethylsiloxy to phenylethylmethylsiloxy ratio of 1:1 was obtained. This oil passed the detrimental volatility test previously described.

Example VII

The oil from Example I was emulsified using a morpholine stearate emulsifier according to the following procedure:

Stearic acid (5.2 g.) was heated to about 60° C. to form a melt and morpholine (1.8 g.) and water (7.0 g.) were added with stirring to form a paste. The oil from Example I (35 g.) was then added and the mixture stirred vigorously. Water (50 g.) and ethylene glycol (1.0 g.) were added and the agitation continued until the mixture was uniform. The emulsion formed in this manner was fairly fluid but became more viscous on standing.

This emulsion gave good lubrication and was easily removed from a metal surface prior to painting. The dried emulsion had excellent resistance to re-emulsification.

Example VIII

Stearic acid (241 g.) water (323 g.) and morpholine (82 g.) were mixed to form a morpholine stearate emulsifier. The oil from Example V (1,604 g.) and water (2,295 g.) were added to the emulsifier with agitation. A very viscous thixotropic emulsion was obtained. This emulsion passed the ease of cleaning test previously described under (2a) and (2b).

Example IX

Stearic acid (241 g.), water (323 g.) and morpholine (82 g.) were mixed as in Examples VIII to form a morpholine stearate emulsifier. A dimethylsiloxyphenylethylsiloxane copolymer oil (1,604 g.) having a dimethylsiloxy to (phenylethyl)methylsiloxy ratio of 3:1 and having a viscosity of approximately 500 centistokes was added to the emulsifier with agitation and then 2,296 grams of water were added with further agitation. A thixotropic emulsion was obtained. This emulsion passed the ease of cleaning test previously described under (2a) and (2b).

*Example X*

The following oils and emulsions were tested according to the procedure described above to determine their lubricating ability. The following results were obtained:

| Oil Used | Dimethylsiloxy to Phenylethylmethylsiloxy ratio | Lubricating Ability |
|---|---|---|
| Oil of Example II | 0 to 1 | Poor. |
| Oil of Example III | 3 to 1 | Satisfactory. |
| Oil of Example IV | 2 to 1 | Do. |
| Oil of Example VI | 1 to 1 | Good. |
| Oil of Example VII | 3 to 1 | Do. |
| Emulsion of Example VIII | 2 to 1 | Satisfactory. |
| Emulsion of Example IX | 3 to 1 | Do. |
| Dimethylsilicone oil | 1 to 0 | Very good. |

*Example XI*

The following table gives the results of the ease of cleaning test for the copolymeric (phenylethyl)methylsiloxanedimethylsiloxane oils of this invention as compared to a normal dimethylsilicone oil:

| Oil Used | Dimethylsiloxy to Phenylethylmethylsiloxy ratio | Ease of Cleaning Test (2a) No. of Washes With Naphthol Spirits Dampened Cloth | | |
|---|---|---|---|---|
| | | 0 | 1 | 2 |
| Oil of Example I | 3 to 1 | | | Very good. |
| Oil of Example II | 0 to 1 | Good | | Do. |
| Oil of Example IV | 2 to 1 | Poor | Fair | Do. |
| Oil of Example VI | 1 to 1 | Very good | | Do. |
| Emulsion of Example VIII | 2 to 1 | | Poor | Do. |
| Emulsion of Example IX | 3 to 1 | | do | Good. |
| Dimethylsilicone oil 50 cs | 1 to 0 | Very poor | Very poor | Very poor. |

*Example XII*

A copolymeric (phenylethyl)methylsiloxane-dimethylsilicone oil (7.0 g.) similar to that prepared in Example IV was charged into a 6 oz. Aerosol bomb along with stearic acid (7.0 g.) Freon–11 (75 mls., 111.4 g.) and Freon–12 (45 mls., 59.4 g.). The resultant solution was sprayed on rubber gasketing material. After the Freons had evaporated, the residual film had excellent lubricating properties when tested in the above-described manner.

*Example XIII*

Into a one liter flask equipped with a stirrer and thermometer were charged dimethylsiloxane (514 g.), methylhydrogensiloxane (180 g.) and hexamethyldisiloxane (8.1 g.). Concentrated sulfuric acid (7.0 g.) was then added and the mixture agitated with stirring at room temperature under a nitrogen blanket for 18 hours. Isopropyl ether (700 g.) was then added. The mixture was washed four times with a total of 70 g. of water. The polymeric siloxane was filtered through two thicknesses of No. 802 paper between the third and fourth water washes. The washed product was then filtered through two thicknesses of No. 802 paper into a clean flask. The solvent was stripped off by heating to 150° C. The product was then sparged at 150° C. for 1 hour with 1 liter nitrogen/minute/1000 g. fluid. The product was an oil having a viscosity of 86 centistokes at 25° C. and contained 69.5 weight percent dimethylsiloxane, 30.0 weight percent methylhydrogensiloxane and 0.5 weight percent trimethylsiloxy end-blocker.

A portion of this product (42.2 g.) was charged to a 2-liter, 3-necked flask equipped with an agitator, nitrogen sparge tube, addition funnel, distillation head and thermowatch kettle temperature controller. The flask and contents were sparged for 1 hour at room temperature with 3 liters/minute of nitrogen. An ethanol solution of chloroplatinic acid containing 25 parts per million by weight platinum (based on weight of final product) was then added to the flask. Alpha-methylstyrene (23.3 g.) was placed in the addition funnel along with an ethanol solution of chloroplatinic acid containing 25 parts per million by weight platinum (based on weight of final product). The nitrogen sparge to the flask was reduced to 0.5 liter/minute and the flask was heated to 130° C. The alpha-methylstyrene was then added to the flask at a rate of about 3 cc./min. An exothermic reaction began which increased flask temperature to about 140° C. After about three-quarters of the alpha-methylstyrene was added, the flask temperature began to drop to 130° C. Heat was added externally to the flask to maintain its temperature at 130° C. After alpha-methylstyrene addition was complete, heating was continued at 130° C. for 1 hour. The nitrogen sparge was increased to 1 liter/min. and the temperature was increased to 150° C. and maintained at this temperature with nitrogen sparging for 1 hour. The product was cooled to room temperature and filtered. This product had a viscosity of 1050 centistokes and had a composition depicted by the formula:

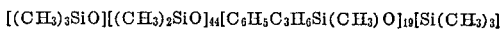
[(CH₃)₃SiO][(CH₃)₂SiO]₄₄[C₆H₅C₃H₆Si(CH₃)O]₁₉[Si(CH₃)₃]

A cured rubber molding sample was cleaned with hexane and dried. This sample was then brushed with a hexane solution containing 35 weight percent of the above prepared copolymeric oil. The sample was then stored for 48 hours at 50° C. The sample was cooled to room temperature and a piece of unlubricated rubber molding was rubbed over the above-coated rubber sample. The lubricity was rated as excellent.

*Example XIV*

The procedure of Example XIII above was followed utilizing ethylmethylsiloxane (153 g.), methylhydrogensiloxane (45 g.) and hexamethyldisiloxane (2.0 g.) to form an oil having a viscosity of 54 centistokes at 25° C. Then 80 g. of this oil was reacted with alpha-methylstyrene (39 g.) in the presence of chloroplatinic acid to form a copolymeric product having a viscosity of 530 centistokes at 25° C. and having a composition depicted by the formula:

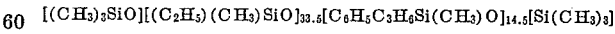
[(CH₃)₃SiO][(C₂H₅)(CH₃)SiO]₃₃.₅[C₆H₅C₃H₆Si(CH₃)O]₁₄.₅[Si(CH₃)₃]

This material was found to be an excellent lubricant for rubber according to the above described lubricity test.

*Example XV*

The procedure of Example XIV above was followed to prepare an ethylmethylsiloxane-methylhydrogensiloxane copolymer. This copolymer was then reacted with allyl benzene in the presence of chloroplatinic acid to form a copolymer oil product having a viscosity of 5000 centistokes at 25° C. and having a composition depicted by the formula:

[(CH₃)₃SiO][(C₂H₅)(CH₃)SiO]₅₂[C₆H₅CH₂CH₂CH₂Si(CH₃)O]₂₂[Si(CH₃)₃]

This copolymeric oil was excellent as a rubber lubricant.

Example XVI

The procedure of Example XIV above was followed to prepare an ethylmethylsiloxane-methylhydrogensiloxane copolymer. This copolymer was then reacted with vinyl toluene in the presence of chloroplatinic acid to form a copolymer oil product having a viscosity of 3900 centistokes at 25° C. and having a composition depicted by the formula:

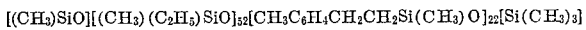

This copolymeric oil was excellent as a rubber lubricant.

Example XVII

The procedure of Example XIV above was followed to prepare an ethylmethylsiloxane-methylhydrogensiloxane copolymer. This copolymer was then reacted with styrene in the presence of chloroplatinic acid to form a copolymer oil product having a viscosity of 2800 centistokes at 25° C. and having a composition depicted by the formula:

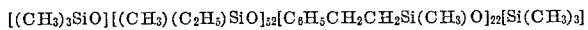

This copolymeric oil was excellent as a rubber lubricant.

What is claimed is:

1. As a composition of matter, an oil in water emulsion comprising from 5 to 50 percent by weight of a liquid copolymeric organosiloxane oil of the formula:

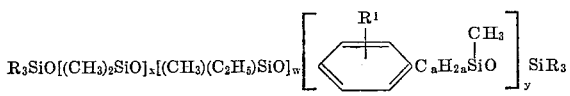

wherein R is a hydrocarbyl group, $R^1$ is selected from the class consisting of a hydrogen atom and a methyl radical, $(a)$ is a whole number from 2 to 3 inclusive, $(x)$ is a number, $(w)$ is a number, the sum of $(x)$ and $(w)$ is at least 1, $(y)$ is a number of at least 1, the ratio of $(x)+(w)$ to $(y)$ is from 1:1 to 3:1, and the viscosity of said copolymeric organosiloxane oil at 25° C. is from 25 centistokes to 10,000 centistokes, from 1.5 to 20 percent by weight of an emulsifying agent and from 48.5 to 93.5 percent by weight water.

2. As a composition of matter, an oil in water emulsion comprising from 5 to 50 percent by weight of a liquid copolymeric organosiloxane oil of the formula:

wherein R is a hydrocarbyl group, $(x)$ is a number of at least 1, $(y)$ is a number of at least 1, the ratio of $(x)$ to $(y)$ is from 1:1 and 3:1, and the viscosity of said oil is from 25 centistokes to about 10,000 centistokes at 25° C., from 1.5 to 20 percent by weight of an emulsifying agent and from 48.5 to 93.5 percent by weight water.

3. As a composition of matter, an oil in water emulsion comprising from 5 to 50 percent by weight of a liquid copolymeric organosiloxane oil of the formula:

wherein R is a methyl group, $(x)$ is a number of at least 1, $(y)$ is a number of at least 1, the ratio of $(x)$ to $(y)$ is from 1:1 to 3:1, and the viscosity of said oil is from 25 centistokes to about 10,000 centistokes at 25° C., from 1.5 to 20 percent by weight of an emulsifying agent and from 48.5 to 93.5 percent by weight water.

4. As a composition of matter, an oil in water emulsion comprising from 5 to 50 percent by weight of a liquid copolymeric organosiloxane oil of the formula:

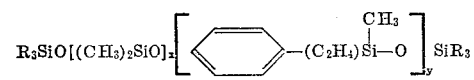

wherein R is a hydrocarbyl group, $(x)$ is a number of at least 1, $(y)$ is a number of at least 1, the ratio of $(x)$ to $(y)$ is from 1:1 to 3:1 and the viscosity of said oil is from 25 centistokes to 10,000 centistokes at 25° C., from 1.5 to 20 percent by weight of ammonium stearate and from 48.5 to 93.5 percent by weight water.

5. As a composition of matter, an oil in water emulsion comprising from 5 to 50 percent by weight of a liquid copolymeric organosiloxane oil of the formula:

wherein R is a hydrocarbyl group, $(x)$ is a number of at least 1, $(y)$ is a number of at least 1, the ratio of $(x)$ to $(y)$ is from 1:1 to 3:1, and the viscosity of said oil is from 25 centistokes to about 10,000 centistokes at 25° C., from 1.5 to 20 percent by weight morpholine stearate and from 48.5 to 93.5 percent by weight water.

6. As a composition of matter, an oil in water emulsion comprising from 5 to 50 percent by weight of a liquid copolymeric organosiloxane oil of the formula:

wherein R is a hydrocarbyl group, $(x)$ is a number of at least 1, $(y)$ is a number of at least 1, the ratio of $(x)$ to $(y)$ is from 1:1 to 3:1 and the viscosity of said oil is from 25 centistokes to 10,000 centistokes at 25° C., from 1.5 to 20 percent by weight of a polyoxyethylene monostearate and from 48.5 to 93.5 percent by weight water.

7. As a composition of matter, an oil in water emulsion comprising from 5 to 50 percent by weight of a liquid copolymeric organosiloxane oil of the formula:

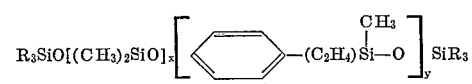

wherein R is a methyl group, $(x)$ is a number of at least 1, $(y)$ is a number of at least 1, the ratio of $(x)$ to $(y)$ is from 1:1 to 3:1, and the viscosity of said oil is from 25 centistokes to about 10,000 centistokes at 25° C., from 1.5 to 20 percent by weight of morpholine stearate and from 48.5 to 93.5 percent by weight water.

8. As a composition of matter, an oil in water emulsion comprising from 5 to 50 percent by weight of a liquid copolymeric organosiloxane oil of the formula:

wherein R is a methyl group, $(x)$ is a number of at least 1, $(y)$ is a number of at least 1, the ratio of $(x)$ to $(y)$ is from 1:1 to 3:1 and the viscosity of said oil is from 25 centistokes to 10,000 centistokes at 25° C., from 1.5 to 20 percent of ammonium stearate and from 48.5 to 93.5 percent by weight water.

9. As a composition of matter, an oil in water emulsion comprising from 5 to 50 percent by weight of a liquid copolymeric organosiloxane oil of the formula:

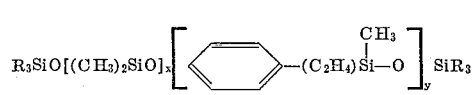

wherein R is a methyl group, $(x)$ is a number of at least 1, $(y)$ is a number of at least 1, the ratio of $(x)$ to $(y)$ is from 1:1 to 3:1, and the viscosity of said oil is from 25 centistokes to about 10,000 centistokes at 25° C., from 1.5 to 20 percent by weight of a polyoxyethylene monostearate and from 48.5 to 93.5 percent by weight water.

10. As a composition of matter, an oil in water emulsion comprising from 5 to 50 percent by weight of a liquid copolymeric organosiloxane oil of the formula:

wherein R is a hydrocarbyl group, $(x)$ is a number of at least 1, $(y)$ is a number of at least 1, the ratio of $(x)$ to $(y)$ is from 1:1 to 3:1 and the viscosity of said oil is from 25 centistokes to 10,000 centistokes at 25° C., from 1.12 to 16 percent by weight stearic acid, from 0.38 to 4 percent by weight morpholine and from 48.5 to 93.5 percent by weight water.

References Cited by the Examiner
UNITED STATES PATENTS 2,457,677  12/1948  Hyde _____ 260—448.2
2,820,798  1/1958  Bailey et al.

OTHER REFERENCES

Currie et al.: "I. and E. Chem." vol. 42, December 1950, pp. 2457–2462.

DANIEL E. WYMAN, *Primary Examiner*.

UNITED STATES PATENT OFFICE
CERTIFICATE OF CORRECTION

Patent No. 3,231,496            January 25, 1966

Anton S. Pater

It is hereby certified that error appears in the above numbered patent requiring correction and that the said Letters Patent should read as corrected below.

Column 13, lines 47 to 50, the formula should appear as shown below instead of as in the patent:

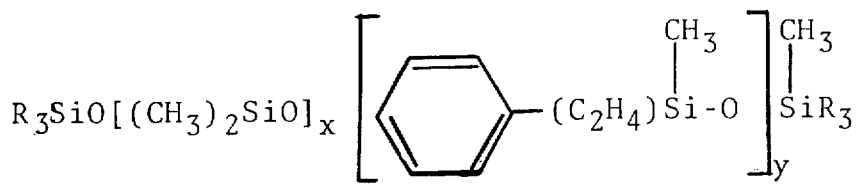

Signed and sealed this 17th day of January 1967.

(SEAL)
Attest:

ERNEST W. SWIDER
Attesting Officer

EDWARD J. BRENNER
Commissioner of Patents